US00RE38163E

(19) United States
(12) Reissued Patent
Spero

(10) Patent Number: US RE38,163 E
(45) Date of Reissued Patent: Jul. 1, 2003

(54) BRAKE EQUALIZER WITH HOUSING ENCLOSING PISTON AND SHOCK ABSORBER

(76) Inventor: Theodore P. Spero, 1035 Detroit Ave., Unit 240, Concord, CA (US) 94518

(21) Appl. No.: 09/686,528

(22) Filed: Oct. 11, 2000

Related U.S. Patent Documents

Reissue of:
(64) Patent No.: 5,820,227
Issued: Oct. 13, 1998
Appl. No.: 08/519,128
Filed: Aug. 24, 1995

(51) Int. Cl.[7] ..... B60T 17/04
(52) U.S. Cl. ..... 303/87; 138/31
(58) Field of Search ..... 303/87; 138/30, 138/26, 31, 40, 46, 41; 92/162 R, 168

(56) References Cited

U.S. PATENT DOCUMENTS 3,451,431 A * 6/1969 Royer
3,757,825 A * 9/1973 Givens et al.
3,931,755 A * 1/1976 Hatridge
4,166,655 A * 9/1979 Spero
4,220,376 A * 9/1980 Spero
5,078,455 A * 1/1992 Washington

FOREIGN PATENT DOCUMENTS

JP 5-39022 * 2/1993

* cited by examiner

*Primary Examiner*—Douglas C. Butler
(74) *Attorney, Agent, or Firm*—Richard E. Peterson

(57) ABSTRACT

An improved brake equalizer apparatus for equalizing fluid pressure and damping shock waves or pressure surges in fluid lines of a fluid pressure-actuated system, such as a hydraulic brake system. The apparatus has a shorter reaction time than a conventional brake equalizer, and can be manufactured with smaller overall length and weight. An important feature of the apparatus which results in reduced brake equalizer reaction time is an improved brake equalizer piston. The piston of the invention is shorter than a conventional brake equalizer piston (the ratio of the inventive piston's length to the length of the shock absorber which it abuts is substantially less than 0.5, and is preferably equal to about 0.23). The piston of the invention is also lighter than a conventional brake equalizer piston, and is preferably made of a hard, non-compressible, self-lubricating material. The brake equalizer of the invention does not employ any O-ring or other seal between the piston and the surrounding housing along which the piston slides, thus eliminating friction that would otherwise exist between such a seal and the housing as the piston slides along the housing.

17 Claims, 5 Drawing Sheets

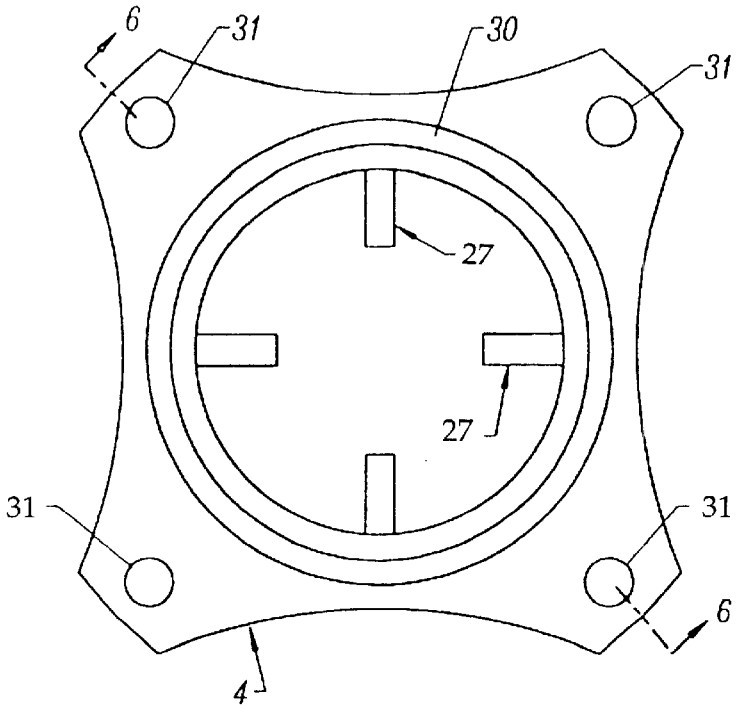
FIG. 5
AMENDED
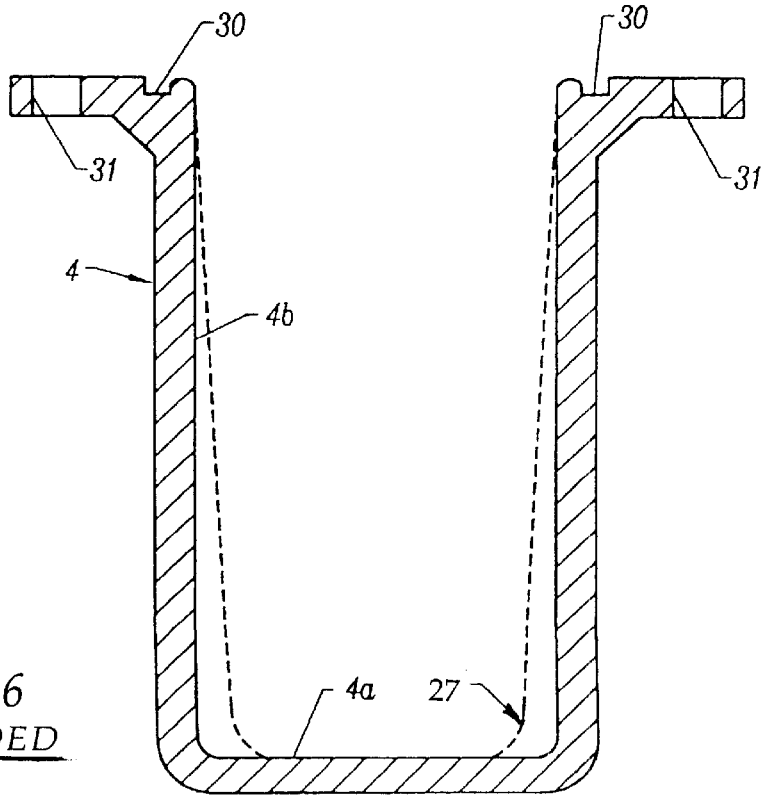
FIG. 6
AMENDED

BRAKE EQUALIZER WITH HOUSING ENCLOSING PISTON AND SHOCK ABSORBER

Matter enclosed in heavy brackets [ ] appears in the original patent but forms no part of this reissue specification; matter printed in italics indicates the additions made by reissue.

FIELD OF THE INVENTION

The invention relates to brake equalizer apparatus for equalizing fluid pressure and damping shock waves or pressure surges in fluid lines of a fluid pressure-actuated system, such as a hydraulic brake system.

BACKGROUND OF THE INVENTION

Devices (sometimes referred to as "brake equalizers") have been used to equalize fluid pressure and damp shock waves and pressure surges, in fluid lines of hydraulic brake systems. Brake equalizers are described in U.S. Pat. No. 4,166,655, issued Sep. 4, 1979 to the present inventor, U.S. Pat. No. 4,220,376, issued Sep. 2, 1980 to the present inventor, and U.S. Pat. No. 5,078,455, issued Jan. 7, 1992 to Washington, for example.

The brake equalizer described in U.S. Pat. No. 4,220,376 includes a rigid piston 48 attached to an elastomeric shock absorber 50. Piston 48 and shock absorber 50 are enclosed within a bore in a rigid housing 56. One end of piston 48 is exposed to fluid within chamber 42, and the other end of piston 48 abuts a first end of shock absorber 50. The other end of absorber 50 rests against a closed end of the bore. A volume between the sides of absorber 50 and housing 56 is partially filled with liquid (such as oil). An O-ring seal 84 between piston 48 and housing 56 prevents this liquid from escaping into chamber 42, and prevents fluid in chamber 42 from reaching absorber 50. Absorber 50 is said to be preferably molded from a rubber-like elastomer, such as neoprene having a Shore hardness of about 65.

The apparatus opposes pressure surges in the fluid in chamber 42 as follows. In response to each pressure increase in chamber 42, piston 48 effectively increases the volume of chamber 42 by sliding toward absorber 50, thereby compressing absorber 50 against the closed end of the bore. As absorber 50 deforms, it absorbs the energy imparted to it by moving piston 48.

When the fluid pressure drops in chamber 42, piston 48 opposes the pressure decrease by effectively decreasing the volume of chamber 42 as it slides away from absorber 50.

U.S. Pat. No. 4,166,655 discloses an improved version of the brake equalizer of U.S. Pat. No. 4,220,376. The apparatus of U.S. Pat. No. 4,166,655 differs from that of U.S. Pat. No. 4,220,376 primarily by including a diaphragm 18 between the piston (piston 16) and the chamber within which fluid pressure variations are to be equalized (chamber 60). Diaphragm 18 is comprised of resilient elastomer, and preferably includes a metal plate bonded to the elastomer to protect the elastomer from damage by contaminants in flowing fluid in chamber 60. The function of diaphragm 18 is to seal the piston/shock absorber assembly from fluid in chamber 60, while transmitting pressure variations in such fluid to the piston.

Also, the U.S. Pat. No. 4,166,655 apparatus includes annular rubber shims (98, 100) around the piston, in addition to an O-ring seal 96, for the stated purpose of improving the fluid seal between the piston and the housing against which the piston slides. U.S. Pat. No. 4,166,655 teaches that the housing (including body 20 and cap 22) has a preferred length of 6.4 inches, and that absorber 14 is preferably molded of neoprene having a Shore hardness in the range between 62 and 65.

The brake equalizer of U.S. Pat. No. 5,078,455 is similar in relevant respects to that of U.S. Pat. No. 4,166,655. The piston of U.S. Pat. No. 5,078,455 has two O-ring seals 12 around it (in counterbores 92 and 93) rather than one, for providing a fluid seal between the piston and the surrounding cylindrical housing surface.

The inventor of the present application has recognized that conventional brake equalizers have several limitations, including the following:

1. they have slow reaction time, and thus are unable to equalize rapid pressure fluctuations of the type which often occur in brake air line systems; and
2. they have large overall length and weight, which renders them impractical to use in certain applications.

SUMMARY OF THE INVENTION

The invention is an improved brake equalizer apparatus for equalizing fluid pressure and damping shock waves or pressure surges in fluid lines of a fluid pressure-actuated system, such as a hydraulic brake system. The inventive apparatus has a shorter reaction time than a conventional brake equalizer, and can be manufactured with smaller overall length and weight.

An important feature of the invention which results in reduced brake equalizer reaction time, is an improved design for a brake equalizer piston. The inventive piston is shorter than a conventional brake equalizer piston (the ratio of the inventive piston's length to the length of the shock absorber which it abuts is substantially less than 0.5, and is preferably equal to about 0.23). The inventive piston is also lighter than a conventional brake equalizer piston, and is preferably made of a hard, non-compressible, material having a low-friction surface (preferably a hard, castable, self-lubricating material such as ["Royal Cast"] *ROYALCAST®* urethane, which has a hardness of 79 D on the Rockwell hardness scale).

The inventive brake equalizer does not employ any seal (such as an O-ring seal) between the piston and the surrounding housing along which the piston slides, thus eliminating friction that would otherwise be present between such a seal and the housing as the piston slides along the housing. Besides reducing the reaction time of the brake equalizer (by reducing the piston assembly's sliding friction), elimination of seals from around the inventive piston also eliminates the need for providing oil in the volume between the sides of the piston/shock absorber assembly and the surrounding housing.

In a preferred embodiment, the inventive piston is molded of ["Royal Cast"] *ROYALCAST®* urethane and has a weight of about 3.5 ounces. The inventive piston is preferably used with, but not bonded to, a shock absorber. The shock absorber is preferably made from a resilient material harder than conventional brake equalizer absorber material. Preferably, the shock absorber has a Shore hardness in the range of about 70 to about 75, and is made of a combination of polyether-based urethane (cured with a liquid diamine) and a quantity of a benzoate ester (rather than BUNA-N hard rubber as in the prior art).

The inventive piston design allows the overall length of inventive brake equalizer to be reduced. The inventive piston design enables a preferred embodiment of the brake equalizer's housing (including body and cap portions) to have a length of 4.2 inches or even less (in contrast with the housing of U.S. Pat. No. 4,166,655 which has a preferred length of 6.4 inches).

The inventive brake equalizer design eliminates the need for a metal plate to be bonded to the elastic diaphragm which separates the piston from the variable-pressure fluid (whose pressure is to be equalized). A preferred embodiment of the inventive brake equalizer includes a screen positioned between the diaphragm and the variable-pressure fluid, to prevent contaminants (especially sharp or abrasive particles) from reaching the diaphragm and possibly penetrating through it to the piston/absorber.

BRIEF DESCRIPTION OF THE DRAWINGS

FIG. 5 is a bottom elevational view of the housing body of the FIG. 1 apparatus.

FIG. 6 is a cross-sectional view of the housing body of FIG. 5, taken along line 6'—6' shown in FIG. 5.

DETAILED DESCRIPTION OF THE PREFERRED EMBODIMENT

Figure 1:
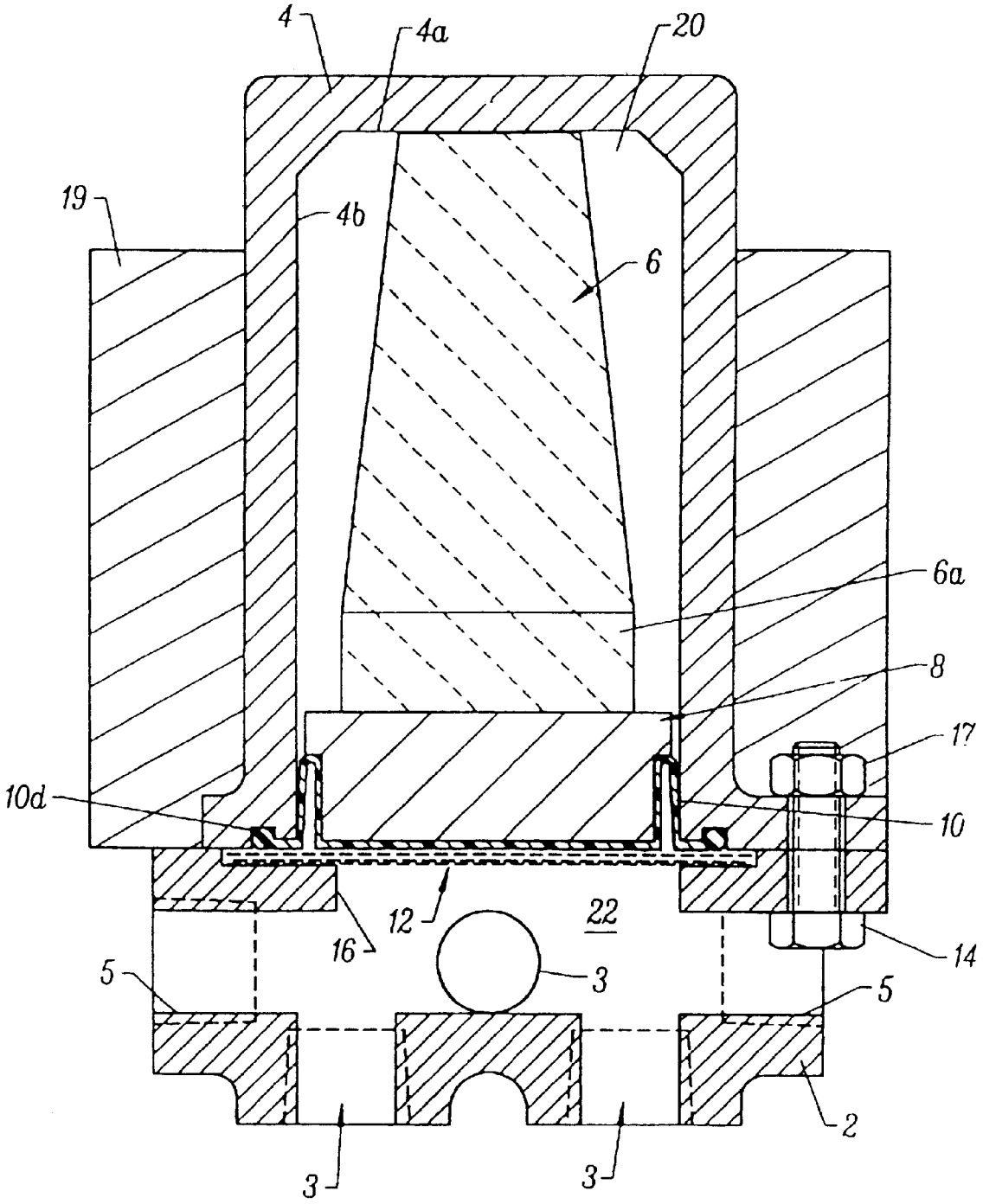
FIG. 1 is a simplified, side cross-sectional view of a preferred embodiment of the brake equalizer of the invention.

FIG. 1 is a simplified, side cross-sectional view of a preferred embodiment of the brake equalizer of the invention. The FIG. 1 apparatus includes a housing (comprising cap 2 and body 4) and a piston-shock absorber assembly (comprising piston 8 and shock absorber 6). Cap 2 and body 4 are connected together by bolts 14 and nuts 17 (one screw 14 and a mating nut 17 are shown in FIG. 1) so as to enclose volumes 20 and 22. An elastic diaphragm 10 (composed of resilient elastomer) separates volume 20 from volume 22, and seals the piston/shock absorber assembly within volume 20 from fluid in volume 22, while transmitting pressure variations in such fluid to piston 8.

Volume 22 is an open chamber having three fluid inlets 3 (shown in FIGS. 1 through 4) and two fluid outlets 5 (shown in FIGS. 1 through 4). The FIG. 1 apparatus functions to counteract (equalize) variations in the pressure of fluid flowing within volume 22. Inlets 3 and outlets 5 are typically connected to fluid lines of a fluid pressure-actuated system, such as a hydraulic brake system. In this case, the FIG. 1 apparatus would function to equalize fluid pressure variations in such lines.

Volume 20 is a closed chamber having an annular cross-section, bounded by shock absorber 6 and piston 8 (on the inside) and generally cylindrical side wall 4b of housing body 4 (on the outside).

The FIG. 1 apparatus does not employ an O-ring seal or any other seal between piston 8 and wall 4b, and thus eliminates friction that would otherwise be present between such seal and housing body 4 during translation of piston 8 along wall 4b. Use of such a "non-sealed" piston 8 (i.e., elimination of seals from around piston 8) eliminates the need to provide oil or other lubricant in chamber 20, and also reduces the reaction time of the FIG. 1 apparatus (by reducing piston 8's sliding friction). Non-sealed piston 8 is preferably made of a hard, non-compressible, material having a low-friction surface (preferably a hard, self-lubricating material such as ["Royal Cast"] *ROYALCAST*® urethane, which has a Rockwell hardness of 79 D).

Piston 8 is shorter than a conventional brake equalizer piston. Specifically, the ratio of length L of piston 8 (the dimension indicated in FIG. 7) to length M of shock absorber 6 (the dimension indicated in FIG. 7) is substantially less than 0.5, and is preferably equal to about 0.23. In contrast, the ratio of piston length to shock absorber length in above-cited U.S. Pat. Nos. 4,166,655, 4,220,376, and 5,078,455, is 0.53, 0.92, and 0.55, respectively (as measured from the patent drawings).

Piston 8 is not bonded to shock absorber 6. Thus, piston 8 is free to slide relative to wall 4b toward a stationary shock absorber 6. Then (after piston 8 contacts absorber 6) piston 8 will either push absorber 6 into engagement with end surface 4a of body 4, or piston 8 will compress stationary absorber 6 (if absorber 6 already rests against end surface 4a), as piston continues to slide along wall 4b toward end surface 4a. A previously compressed absorber 6 (compressed between, and engaged with, end surface 4a and piston) will push piston 8 along wall 4b away from end surface 4a as it decompresses back to its original, non-compressed shape.

Preferably, shock absorber 6 is made from a resilient material (preferably having a Shore hardness in the range from about 70 to about 75). In one preferred embodiment, shock absorber 6 is made of plastic having a Shore hardness of about 75 (rather than BUNA-N hard rubber as in the prior art). Such plastic is preferably a combination of polyether-based urethane (cured with a liquid diamine) and a quantity of a benzoate ester. If the Shore hardness of absorber 6 is about 75, then a version of the FIG. 1 apparatus (for use in a vehicle hydraulic braking system) can be designed for maximum operating efficiency for braking from a vehicle speed of 30 mph (assuming an application pressure of 30 p.s.i.).

Piston 8 is not only shorter, but is preferably also lighter, than a conventional brake equalizer piston. In a preferred embodiment, piston 8 is molded of ["Royal Cast"] *ROYALCAST*® urethane and has a weight substantially equal to 3.5 ounces, and the shock absorber 6 used with such piston is molded of urethane having a Shore hardness of about 70.

The inventive piston design allows the overall length of inventive brake equalizer to be reduced. The inventive piston design enables a preferred embodiment of the FIG. 1 apparatus to have a total length (from the top to the bottom of FIG. 1) of 4.2 inches or even less (in contrast with the housing of U.S. Pat. No. 4,166,655 which has a preferred length of 6.4 inches).

With reference again to FIG. 1, mounting bracket 19 is fixedly attached to housing body 4 (for example by bolts, not shown), and screen 12 is mounted between diaphragm 10 and volume 22. Screen 12 prevents contaminants (especially sharp or abrasive particles) in fluid within volume 22 from reaching diaphragm 10 and possibly penetrating through it to volume 20, piston 8, and absorber 6.

Figure 2:
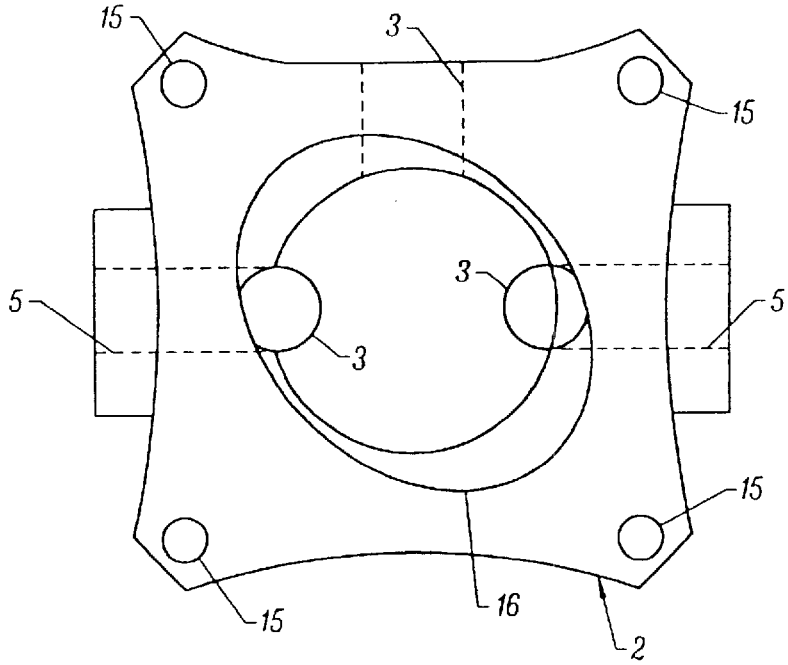
FIG. 2 is a top elevational view of the housing cap of the FIG. 1 apparatus.
Figure 3:
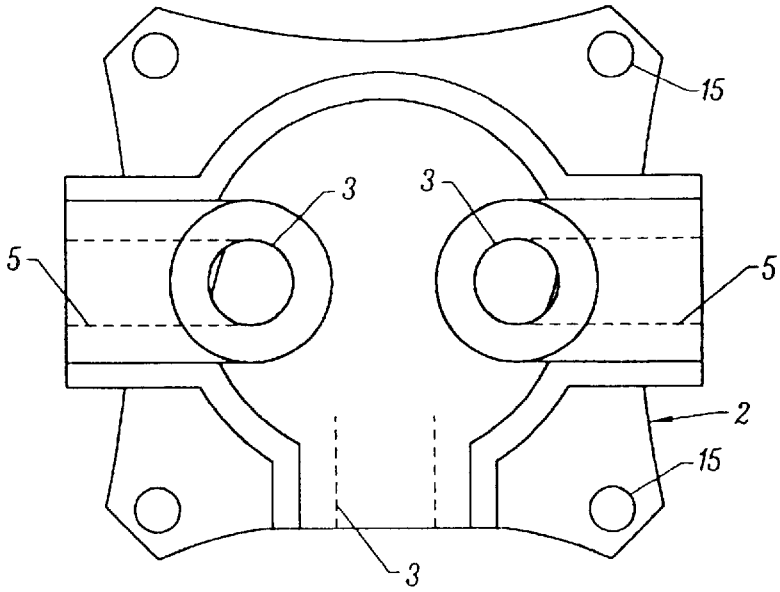
FIG. 3 is a bottom elevational view of the housing cap of the FIG. 1 apparatus.
Figure 4:
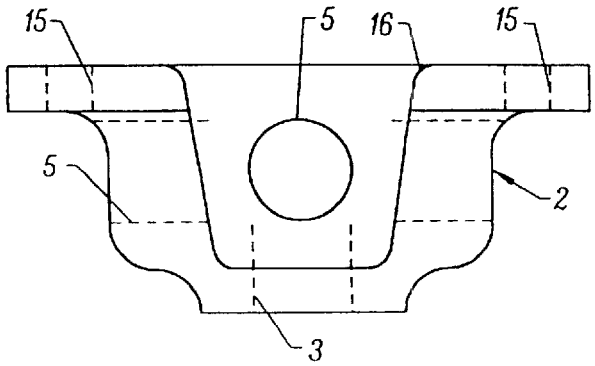
FIG. 4 is a side elevational view of the housing cap of the FIG. 1 apparatus.

As shown in FIGS. 2–4, housing cap 2 has four holes 15 bored through its outer periphery, for alignment with four corresponding holes 31 (shown in FIG. 5) of housing body 4. A bolt 14 is positioned through each pair of aligned holes 15 and 31, for fastening cap 2 to body 4 (after piston 8, absorber 6, diaphragm 10, and screen 12 have been mounted within body 4).

Housing body 2 has a hollow interior and includes the following orifices which extend outward from its hollow interior through its outer surface: top orifice 16 (across which screen 12 is to be positioned), two fluid inlets 3 which extend downward (opposite top orifice 16) and one fluid inlet 3 which extends through the side of cap 2 (the left side in FIG. 4), and two fluid outlets 5 which extend through other sides of cap 2 (the left and right sides in FIG. 3).

As shown in FIGS. 5 and 6, inner wall 4b of housing body 4 is machined to define four ridges [17] *27*. The function of ridges [17] *27* is to center shock absorber 6 within body 4, even at times when absorber 6 is compressed against end surface 4a by piston 8. Four holes 31 (discussed above) are bored through the periphery of housing body 4's lower end (the end opposite surface 4a). An annular groove 30 extends around housing body 4's lower end, for receiving outer ridge 10d of diaphragm 10. When body 4 is assembled with cap 2, and diaphragm 10 and screen 12 are positioned within them (as shown in FIG. 1), diaphragm 10 is held in place because its ridge 10d is pressed between groove 30 and screen 12 (or groove 30 and a facing portion of cap 2).

Figure 7:
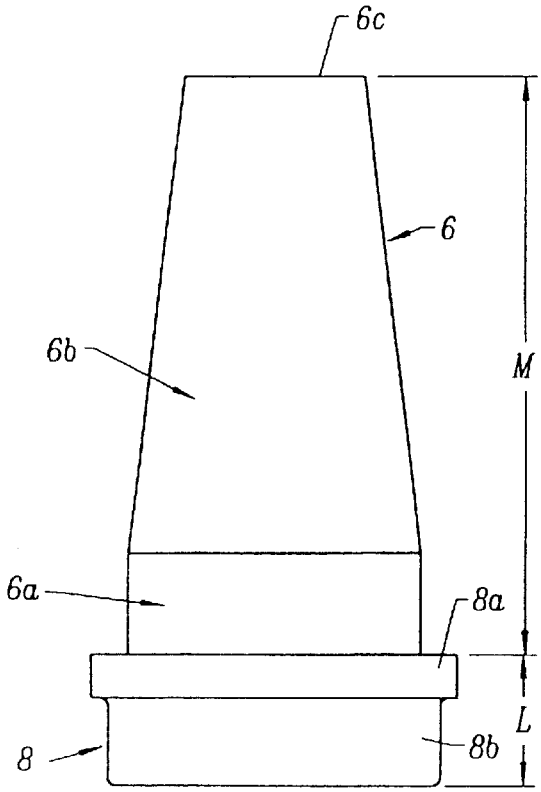
FIG. 7 is a side elevational view of the piston-shock absorber assembly employed in the FIG. 1 apparatus.
Figure 8:
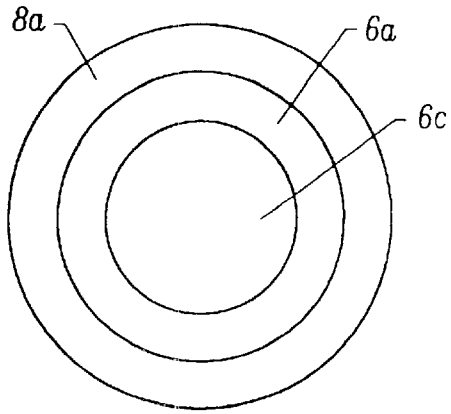
FIG. 8 is a top elevational view of the piston-shock absorber assembly of FIG. 7.

With reference next to FIGS. 7 and 8, the ratio of piston 8's length L to shock absorber 6's length M is substantially less than 0.5, and is preferably equal to about 0.23. Piston 8 has a large diameter cylindrical portion 8a, which faces large diameter cylindrical portion 6a of shock absorber 6. The outer edge of portion 8a is designed to slide with low friction along wall 4b of housing 4. As indicated above, piston 8 (including portion 8a) is preferably made of hard, self-lubricating material, such as ["Royal Cast"] *ROYALCAST®* urethane. Piston 8 also has a tapered, frusto-conical, end portion 8b facing away from absorber 6. Diaphragm 10 will be draped against piston end portion 8b during normal operation, because in normal operation, the pressure within chamber 22 exceeds the pressure within chamber 20. Shock absorber 6 also has a tapered portion 6b (integrally molded with portion 6a), which terminates at upper surface 6c. Surface 6c will abut end surface 4a of housing body 4 when piston 8 compresses absorber 6 against surface 4a. In a preferred embodiment, the diameter of surface 6c is 1.00 inches, the diameter of portion 6a is 1.50 inches, the diameter of portion 8a is 1.975 inches, the minimum diameter of portion 8b is 1.71 inches, length [L] *M* (of absorber 6) is 3.00 inches, and length [M] *L* (of piston 8) is 0.7 inches. The ratio, [M/L] *L/M*, is equal to 0.23 in this embodiment.

Figure 9:
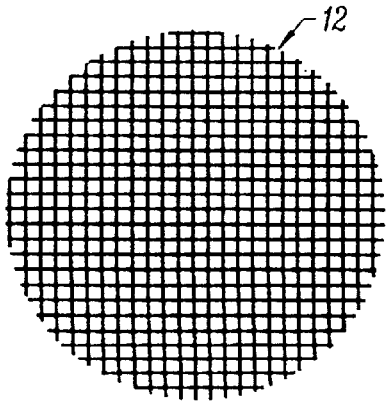
FIG. 9 is a top elevational view of the screen of the FIG. 1 apparatus.

With reference to FIG. 9, screen 12 is preferably composed of SS wire mesh (24 gauge, 8 mesh, 8 wires per inch), and preferably has a diameter of 1.93 inches.

Figure 10:
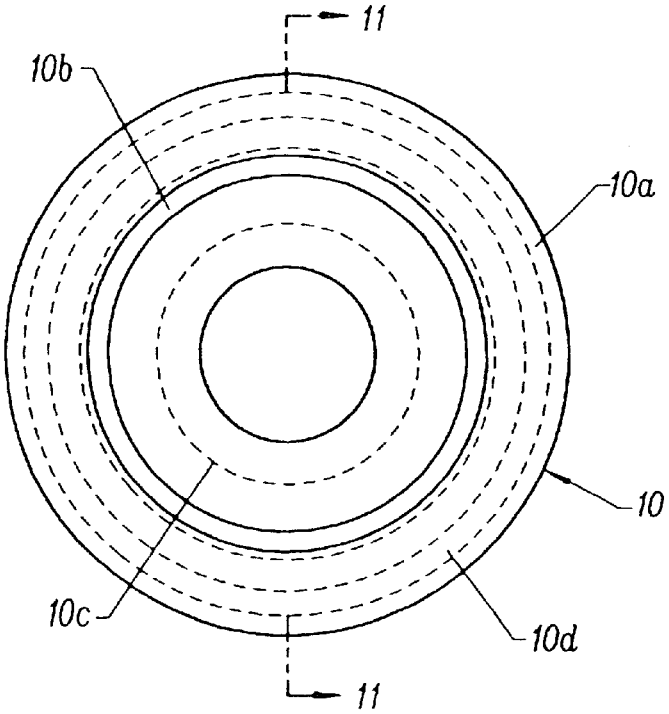
FIG. 10 is a bottom elevational view of the diaphragm of the FIG. 1 apparatus.
Figure 11:
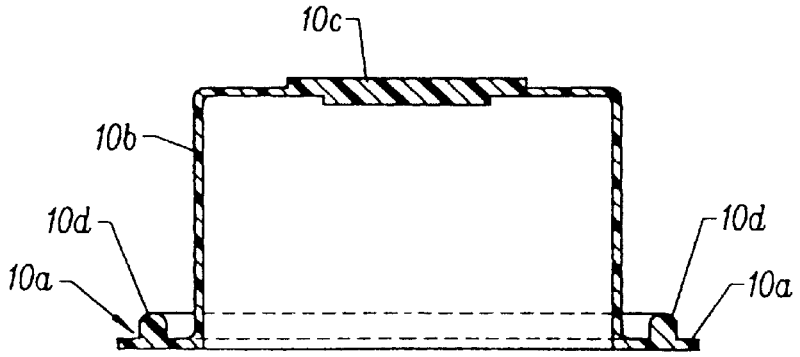
FIG. 11 is a cross-sectional view of the diaphragm of FIG. 10, taken along line 11—11.

With reference to FIGS. 10 and 11, a preferred embodiment of elastic diaphragm 10 is a molded resilient elastomer having the following portions: a relatively thick central portion 10c, a relatively thin outer rim 10a, a relatively thick retaining ring portion 10d (for retention within groove 30 of housing body 4), and a relatively thin portion 10b connecting portion 10c with portion 10d. Central portion 10c lies in a first plane, and portions 10a and 10d lie in a second plane (parallel to, and separated from, the first plane). In a preferred embodiment, central portion 10c has a thickness of about 0.065 inches and diameter of about 1.190 inches, rim 10a has thickness of about 0.020 inches and outer diameter of about 2.600 inches, ring portion 10d has thickness of about 0.060 inches, and portion 10b has thickness of about 0.020 inches. Preferably, diaphragm 10 is made of the material known as "70 BUNA-N rubber," and no metal plate is bonded to diaphragm 10.

Various modifications and variations of the described apparatus of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. An apparatus for equalizing pressure in fluid lines of a fluid pressure-actuated system, comprising:

a housing defining a chamber, said chamber having a closed end and an open end;

an elastic diaphragm extending across the open end of the chamber;

a piston within the chamber, said piston having a length L; and a shock absorber within the chamber between the closed end and the piston, said shock absorber having a length M, where L/M is substantially less than 0.5, and wherein the piston is dimensioned to translate freely along the chamber between the open end and the shock absorber in response to fluid pressure variations transmitted through the diaphragm to the piston.

2. The apparatus of claim 1, wherein the housing includes:

a body portion defining the chamber;

a cap portion, having at least one fluid inlet and at least one fluid outlet; and means for connecting the body portion to the cap portion.

3. The apparatus of claim 2, wherein the elastic diaphragm has a retaining ring portion with an outer ridge, and wherein the body portion has an annular groove, with the outer ridge being located in the annular groove wherein the retaining ring portion is retained between the cap portion and the body portion.

4. The apparatus of claim 3, also including:

a screen between the cap portion and the elastic diaphragm, wherein the retaining ring portion is retained between the body portion and the screen.

5. The apparatus of claim 2, wherein the housing has a longitudinal axis between the closed end and the open end, and wherein the housing has a length not greater than about 4.2 inches along the longitudinal axis.

6. The apparatus of claim 1, wherein the piston is made of urethane having a Rockwell hardness substantially equal to 79 D.

7. The apparatus of claim 1, wherein the piston has a weight of not more than about 3.5 ounces.

8. The apparatus of claim 1, wherein the shock absorber is molded from a substance having a Shore hardness in the range from about 70 to about 75.

9. An apparatus for equalizing pressure in fluid pressure-actuated system, comprising:

a housing defining a chamber, said chamber having a closed end and an open end;

an elastic diaphragm extending across the open end of the chamber;

a piston within the chamber, said piston having a length L; and a shock absorber within the chamber between the closed end and the piston, said shock absorber having a length M, where L/M is substantially less than 0.23, and wherein the piston is dimensioned to translate freely along the chamber between the open end and the shock absorber in response to fluid pressure variations transmitted through the diaphragm to the piston.

10. An apparatus for equalizing pressure in fluid lines of a fluid pressure-actuated system, comprising:

a housing defining a chamber, said chamber having a closed end and an open end;

an elastic diaphragm extending across the open end of the chamber;

a non-sealed piston within the chamber; and a shock absorber within the chamber between the closed end and the piston, wherein the piston is dimensioned to translate freely along the chamber between the open end and the shock absorber in response to fluid pressure variations transmitted through the diaphragm to the piston, wherein the piston is not bonded to the shock absorber and wherein the piston has a length L, the shock absorber has a length M, and L/M is substantially less than 0.5.

11. The apparatus of claim 10, wherein the piston is made of a substantially non-compressible, self-lubricating material.

12. The apparatus of claim 11, wherein the piston is made of a self-lubricating urethane material, having a Rockwell hardness substantially equal to 79 D.

13. The apparatus of claim 12, wherein the shock absorber is molded from a substance having a Shore hardness in the range from about 70 to about 75.

14. A piston for use in an apparatus for equalizing pressure in fluid lines of a fluid pressure-actuated system, wherein the apparatus includes a housing defining a chamber having a closed end and an open end, and a shock absorber having length M in the chamber at the closed end, said piston including:

a first end facing the shock absorber;

a second end opposite the first end; and a sidewall dimensioned so that the piston can translate freely along the chamber between the open end and the shock absorber in response to fluid pressure variations transmitted to the second end, without a seal between the sidewall and the chamber, wherein the piston has a length L, and L/M is substantially less than 0.5.

15. The piston of claim 14, wherein the piston is made of a substantially non-compressible, self-lubricating material.

16. The piston of claim 14, wherein the piston is molded from a self-lubricating urethane material having a Rockwell hardness substantially equal to 79 D.

17. The piston of claim 14, wherein said piston has a weight of not more than about 3.5 ounces.

* * * * *